United States Patent
Singhal

(10) Patent No.: US 8,403,208 B2
(45) Date of Patent: Mar. 26, 2013

(54) APPARATUS AND METHOD FOR A PRIVACY SHIELD IN KEYPAD INPUT DEVICES AT FINANCIAL TRANSACTION TERMINALS

(76) Inventor: Tara Chand Singhal, Torrance, CA (US)

( * ) Notice: Subject to any disclaimer, the term of this patent is extended or adjusted under 35 U.S.C. 154(b) by 0 days.

(21) Appl. No.: 13/447,275

(22) Filed: Apr. 15, 2012

(65) Prior Publication Data

US 2012/0228376 A1    Sep. 13, 2012

Related U.S. Application Data

(63) Continuation of application No. 09/891,913, filed on Jun. 26, 2001, now Pat. No. 8,195,568.

(51) Int. Cl.
  *G07F 19/00*    (2006.01)
(52) U.S. Cl. .................. 235/379; 235/380; 705/43
(58) Field of Classification Search .......... 235/379, 235/380; 705/43–44
  See application file for complete search history.

(56) References Cited

U.S. PATENT DOCUMENTS

| | | | |
|---|---|---|---|
| 4,032,931 A | 6/1977 | Haker | |
| 4,632,511 A | 12/1986 | Louw | |
| 4,722,054 A * | 1/1988 | Yorozu et al. ............ | 705/17 |
| 5,465,090 A | 11/1995 | Deignan | |
| 5,564,486 A | 10/1996 | Deigman | |
| 5,748,728 A * | 5/1998 | Ginsberg et al. ............ | 379/447 |
| 6,065,679 A * | 5/2000 | Levie et al. ............ | 235/462.47 |
| 6,144,319 A * | 11/2000 | Lutz et al. ............ | 341/22 |

FOREIGN PATENT DOCUMENTS

| | | |
|---|---|---|
| BE | 1009780 A6 | 11/1995 |
| CA | 1095623 A1 | 2/1981 |
| DE | 37 23 316 C1 | 10/1988 |
| DE | 41 12 79 A1 | 10/1992 |
| DE | 296 12 045 U1 | 11/1996 |
| DK | 0669 95 A | 12/1996 |
| EP | 0 092 048 A2 | 4/1982 |
| EP | 0 936 644 A1 | 8/1999 |
| FR | 2 692 647 A1 | 6/1992 |
| FR | 2 707 407 A1 | 7/1993 |
| FR | 2 773 903 A1 | 1/1998 |
| WO | WO 97/39558 | 10/1997 |

OTHER PUBLICATIONS

File identifying four Search Queries.
Query 1 relevent search results file.
Query 2 relevent search results file.
Query 3 relevent search results file.
Query 4 relevent search results file.

* cited by examiner

*Primary Examiner* — Christle Marshall
(74) *Attorney, Agent, or Firm* — Steve Roeder, Esq.

(57) ABSTRACT

An input device for inputting personal information has a keypad for selectively inputting personal information and a privacy shield that is positioned adjacent to and extends away from near the keypad, the privacy shield inhibiting someone from viewing personal information entered into the keypad. The input device is part of a sales transaction terminal. The input device is part of an automated teller machine.

10 Claims, 16 Drawing Sheets

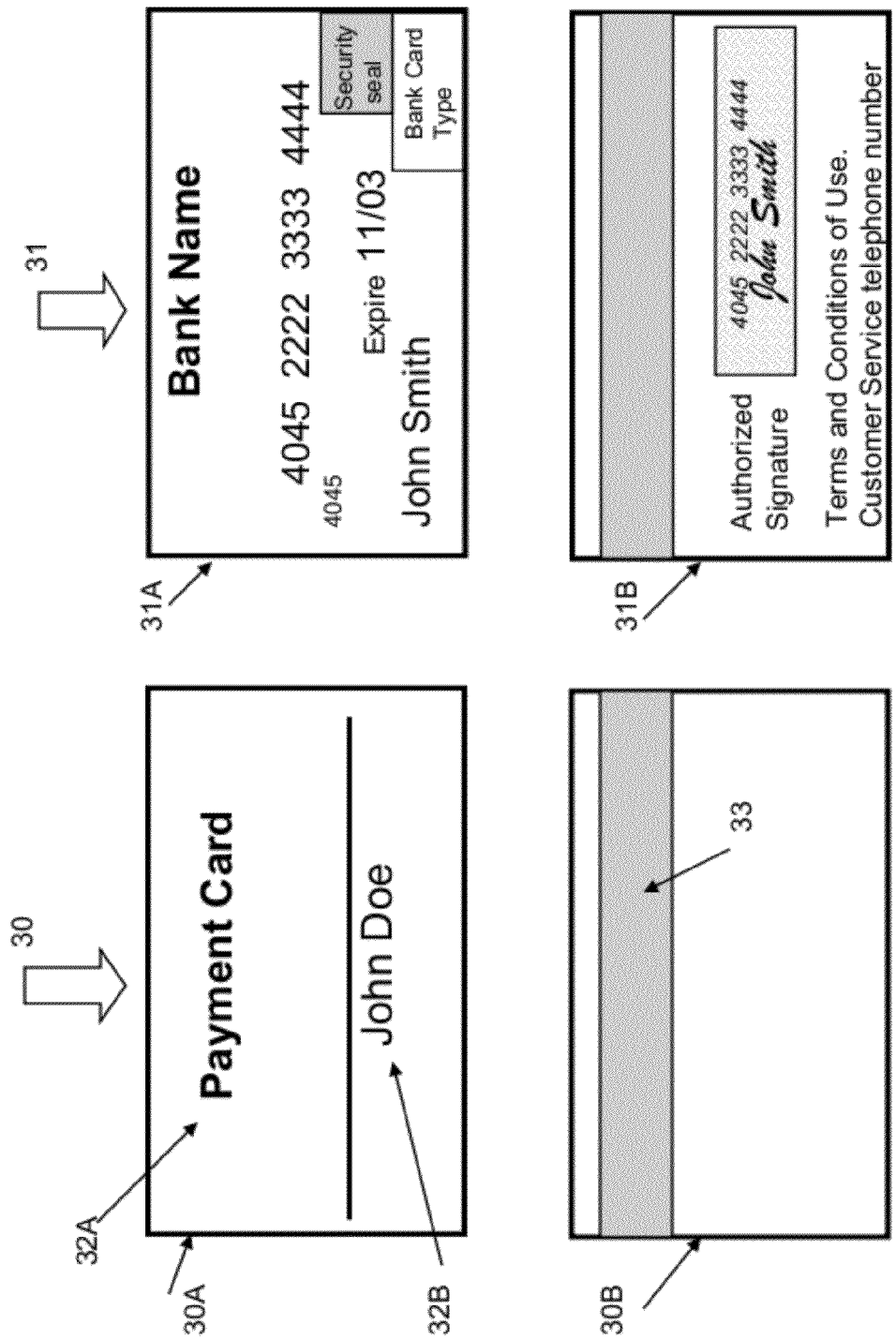

| Customer Identifier 320 | Sequence Numbers 330 |
|---|---|
| xx-xx-xx-xx-xxxxx-xxx-xxxx | 00001 |
| xx-xx-xx-xx-xxxxx-xxx-xxxx | 00002 |
| xx-xx-xx-xx-xxxxx-xxx-xxxx | 00003 |
| xx-xx-xx-xx-xxxxx-xxx-xxxx | 00004 |
| xx-xx-xx-xx-xxxxx-xxx-xxxx | 00005 |
| ... | |
| xx-xx-xx-xx-xxxxx-xxx-xxxx | 0000N |

Identifier database 38A 408 410 412 414 416

FIGURE 3A

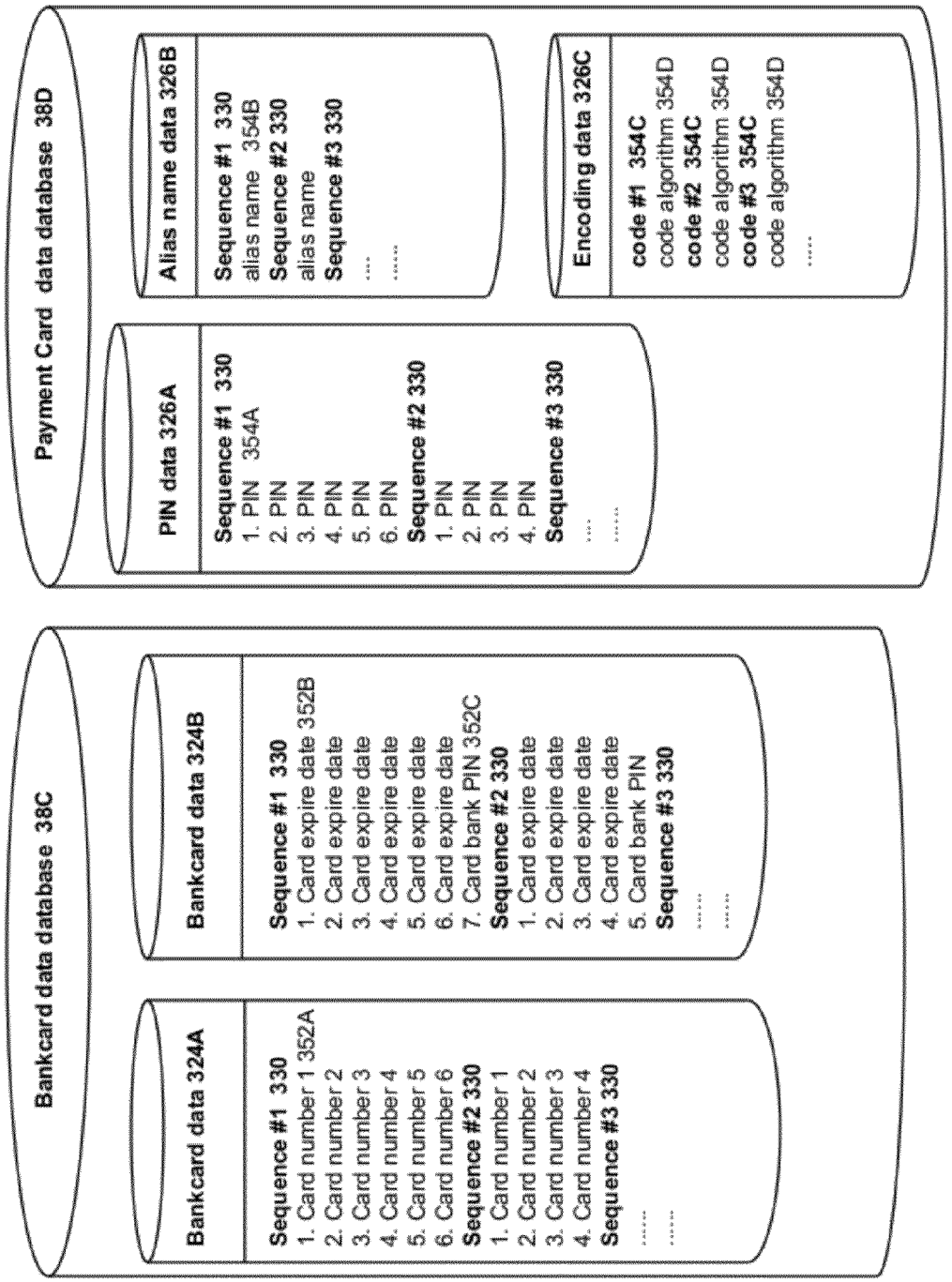

INITIAL PAYMENT SYSTEM WEB PAGE 500A

Create/Enter Customer Identifier 320

| Date | Personal | Location | Name | Number |
| element 408 | element 410 | element 412 | element 414 | element 416 |
| xx-xx-xx | xx | xxxxx | xxx | xxxx |

SEND 514

Select Data Type to Enter/Retrieve 522

Identifying data  322A-E

Bankcard data  324A-B

Payment Card data  326A-B

SEND 534

PAYMENT SYSTEM DATA WEB PAGE 500B

Personal Data Form 524A:
Identifying data 322A-E
Name: 350A
First: _____ Middle: _____ Last: _____ 350B
Address: _____ 350C
City: _____ State _____ ZIP _____
Tel: _____ 350D E-Mail _____ 350E

[SEND]

Bankcard data form 524B
Bankcard data 324A-C
Item  card number 352A                          date 352B   bank PIN 352C
1.  xxxx-xxxx-xxxx-xxxx-xxxx-xxxx               xx/xx
2.  xxxx-xxxx-xxxx-xxxx-xxxx-xxxx               xx/xx       xxxxxx
3.  xxxx-xxxx-xxxx-xxxx-xxxx-xxxx               xx/xx
4.  xxxx-xxxx-xxxx-xxxx-xxxx-xxxx               xx/xx
..........

[SEND]

Payment card data form 524C
Payment card data 326A-B
Item  card PIN 354A
1.    xxxx
2.    xxxx
3.    xxxx
4.    xxxx
Alias name _____ 354B

[SEND]

FIGURE 5B

APPARATUS AND METHOD FOR A PRIVACY SHIELD IN KEYPAD INPUT DEVICES AT FINANCIAL TRANSACTION TERMINALS

CROSS REFERENCE TO RELATED APPLICATIONS

This application is a continuation application of application Ser. No. 09/891,913, titled, "Method And Apparatus For A Payment Card System", filed Jun. 26, 2001 now U.S. Pat. No. 8,195,568, Examiner Sarah Monfeldt, Art Unit 3692, The original application Ser. No. 09/891,913, is incorporated herein by reference.

FIELD OF THE INVENTION

The present invention is directed to a method and apparatus for an input device for inputting personal information that has a keypad for selectively inputting personal information and a privacy shield that is positioned adjacent to and extends away from near the keypad, the privacy shield inhibiting someone from viewing personal information entered into the keypad.

BACKGROUND

People usually carry multiple types of bankcards. The multiple types of bankcards can include charge cards, debit cards, check cards, and merchant cards specific to a merchant. These types of bankcards have become very popular and a large number of people carry multiple different bankcards.

Unfortunately, existing bankcards are not entirely satisfactory, and have a number of deficiencies. For example, existing bankcards suffer from ever changing security issues that the banking industry is always working to solve. Also, it is inconvenient for the customer to carry multiple different bankcards. Existing bankcards have other additional deficiencies than those detailed herein.

SUMMARY

This invention is directed to a payment card that can be used by a customer to perform a transaction with a merchant. In some of the embodiments provided herein, the payment card facilitates the use of an existing bankcard of the customer to conduct a particular transaction. In some of the embodiments, the payment card provides a level of security to the customer because the payment card does not identify the customer. Further, the card number and/or the expiration date of the payment card is not disclosed to the merchant.

The use of the payment card is facilitated by a payment system. The payment system allows the customer to open a payment card account. In one of the embodiments provided herein, the payment system stores private data of the customer that is not directly recognizable and traceable to the customer.

As used herein the term "bank card" shall mean and include charge cards, debit cards, and check cards issued by banks and/or other institutions, and merchant cards specific to a merchant. A number of alternate types of bankcards are already in existence.

Further, as used herein, the term "privacy payment" shall mean and include a form of payment that does not specifically identify the customer to the merchant. For example, the privacy payment does not include and/or disclose the physical address, the social security number, the electronic mail address, and/or information of the bankcards of the customer to the merchant.

Moreover as used herein, the term "private data" shall mean and include data that when taken alone can be used to specifically identify the customer. Private data can include the physical address, the social security number, the electronic mail address, the drivers license number, and/or the information of the bankcards of the customer. Private data is also sometimes referred to as identifying data.

As provided herein, some embodiments of the present invention can allow the customer to purchase one or more items or services from the merchant without the merchant knowing the identity, bankcard information and/or address of the customer. Stated another way, the payment system allows the customer to purchase one or more items or services from the merchant without disclosing the name, physical address, electronic mail address, and bankcard information of the customer to the merchant. As a result thereof, the payment system minimizes the number of people, businesses and institutions that have access to the private data of the customer. This minimizes the opportunity for the private data of the customer to be improperly disseminated.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1A-1E is block diagrams that illustrate an apparatus and method having features of the present invention;

FIGS. 3A-3E are block diagrams that illustrate databases having features of the present invention;

FIGS. 5A and 5B are simplified examples of web pages that can be generated by the payment system.

DESCRIPTION

Introduction

Figure 1A:
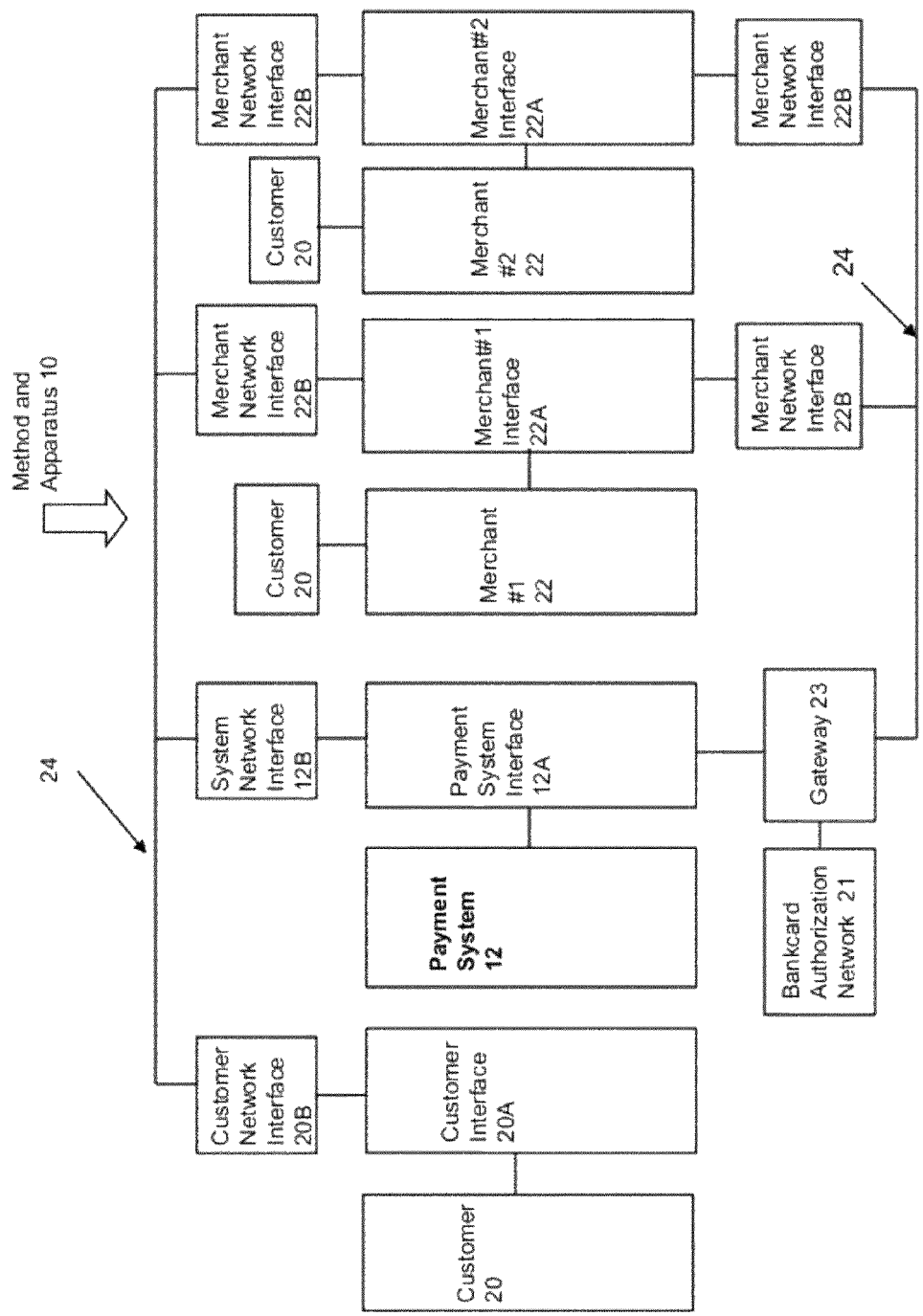

Referring initially to FIGS. 1A-1C, a method and apparatus 10 having features of the present invention can include a payment system 12, a payment system interface 12A, at least one customer interface 20A for a customer 20, one or more merchant interfaces 22A (two are illustrated) for two merchants 22. In some of the embodiments, a payment card 30 (illustrated in FIG. 1B) (i) facilitates the anonymous use of one or more bankcards 31 (illustrated in FIG. 1C) of the customer 20 and (ii) provides anonymity and security to the customer 20 in transactions between the customer 20 and the merchant 22.

As an overview, the present invention allows the customer 20 to maintain private data 25 (illustrated in FIG. 2) of the customer in the payment system 12, and to use the payment card 30 in place of other bankcards 31 of the customer. Preferred and optional aspects of the method and apparatus 10 are described below. The headings are provided for the convenience of the reader.

Payment System 12

Figure 2:
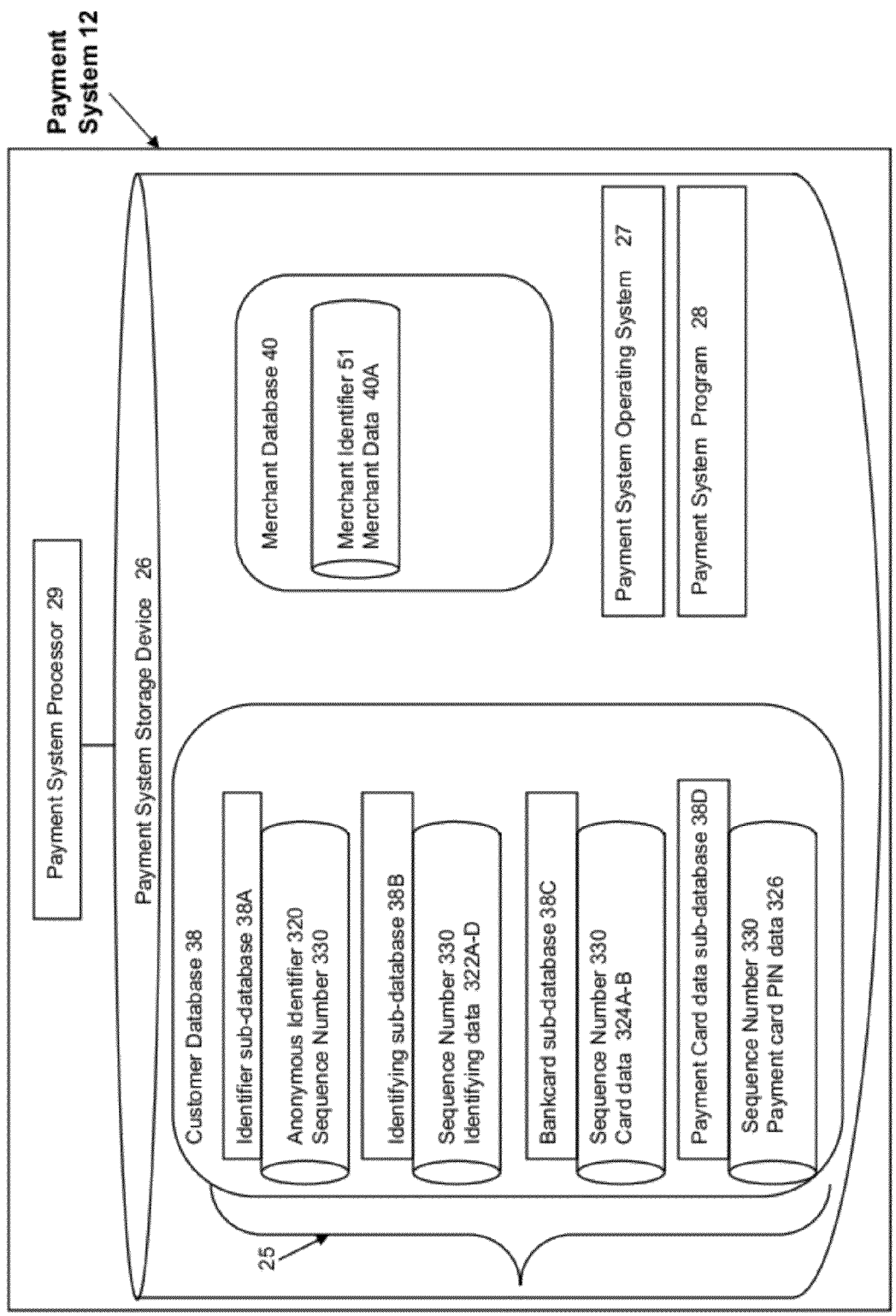
FIG. 2 is a block diagram that illustrates a payment system having features of the present invention.

Referring to FIG. 2, the payment system 12 includes (i) a payment system storage device 26, (ii) a payment system operating system 27 stored in the payment system storage device 26, (iii) a payment system program 28 stored in the payment system storage device 26, (iv) and a payment system processor 29 connected to the payment system storage device 26.

The payment system processor 29 can include one or more conventional CPU's. The payment system processor 29 can be capable of high volume processing and database searches.

The payment system storage device 26 can, for example, include one or more magnetic disk drives, magnetic tape drives, optical storage units, CD-ROM drives and/or flash memory. The payment system storage device 26 also contains a plurality of databases used in the processing of transactions pursuant to the present invention. For example, as illustrated in FIG. 2, the payment system storage device 26 can include a merchant database 40, and a customer database 38. As outlined below, the customer database 38 can retain information regarding one or more existing bankcards 31 of the customer 20. The information can include the customer name, the number for each bankcard 31, and/or the expiration date of each bankcard 31.

Referring back to FIG. 1A, the payment system 12 includes a system network interface 12B that allows the payment system 12 to communicate with the customer 20. Conventional internal or external modems may serve as the system network interface 12B. In one embodiment, the system network interface 12B is connected to the customer interface 20A on a global network 24. Alternately, the system network interface 12B can be connected by an electronic, a voice and/or a traditional communication system that allows the payment system 12 to interact with, the customer interface 20A. For example, the payment system 12 can be connected to the customer interface 20A with one or more phone lines.

Figure 1D:
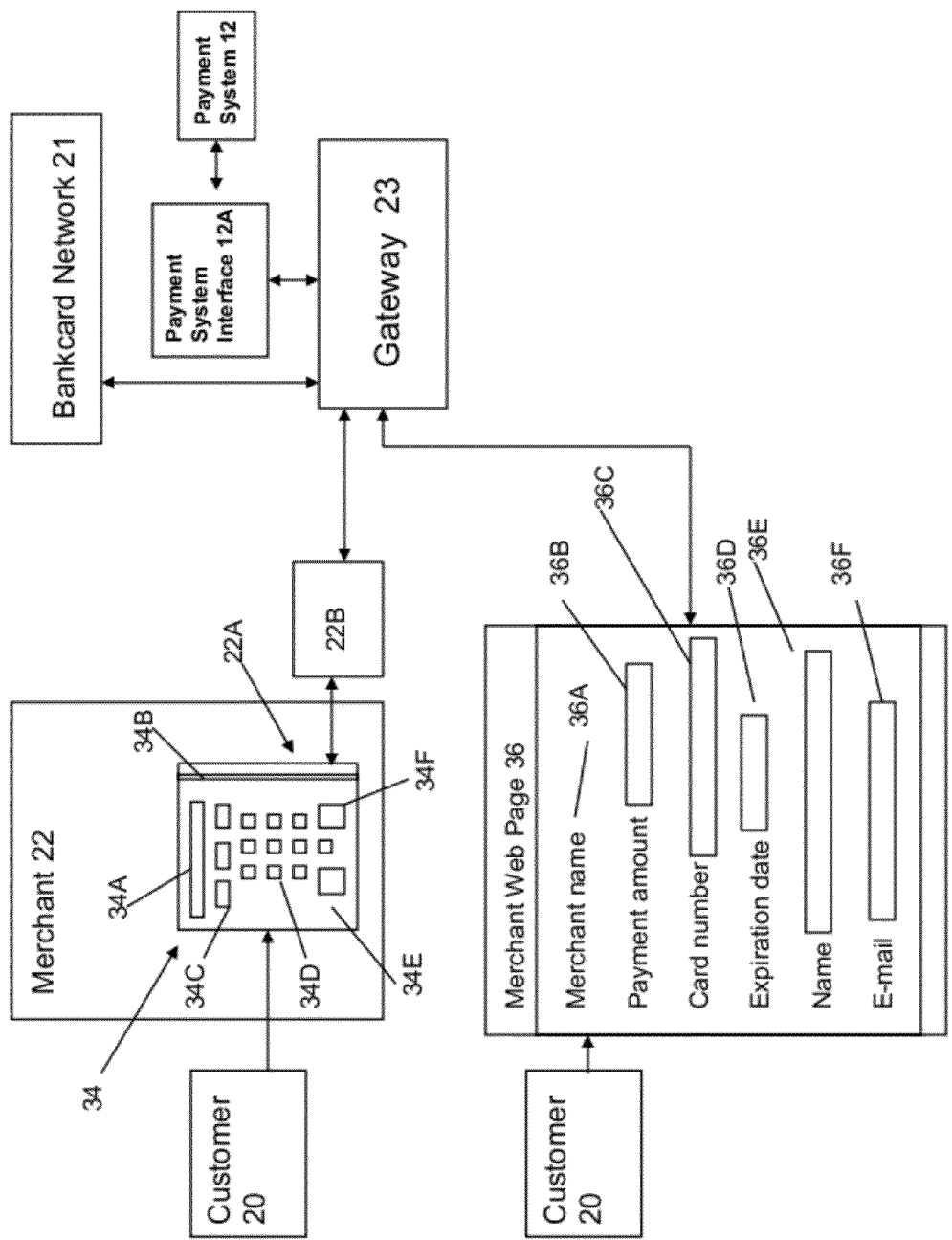
Figure 1E:
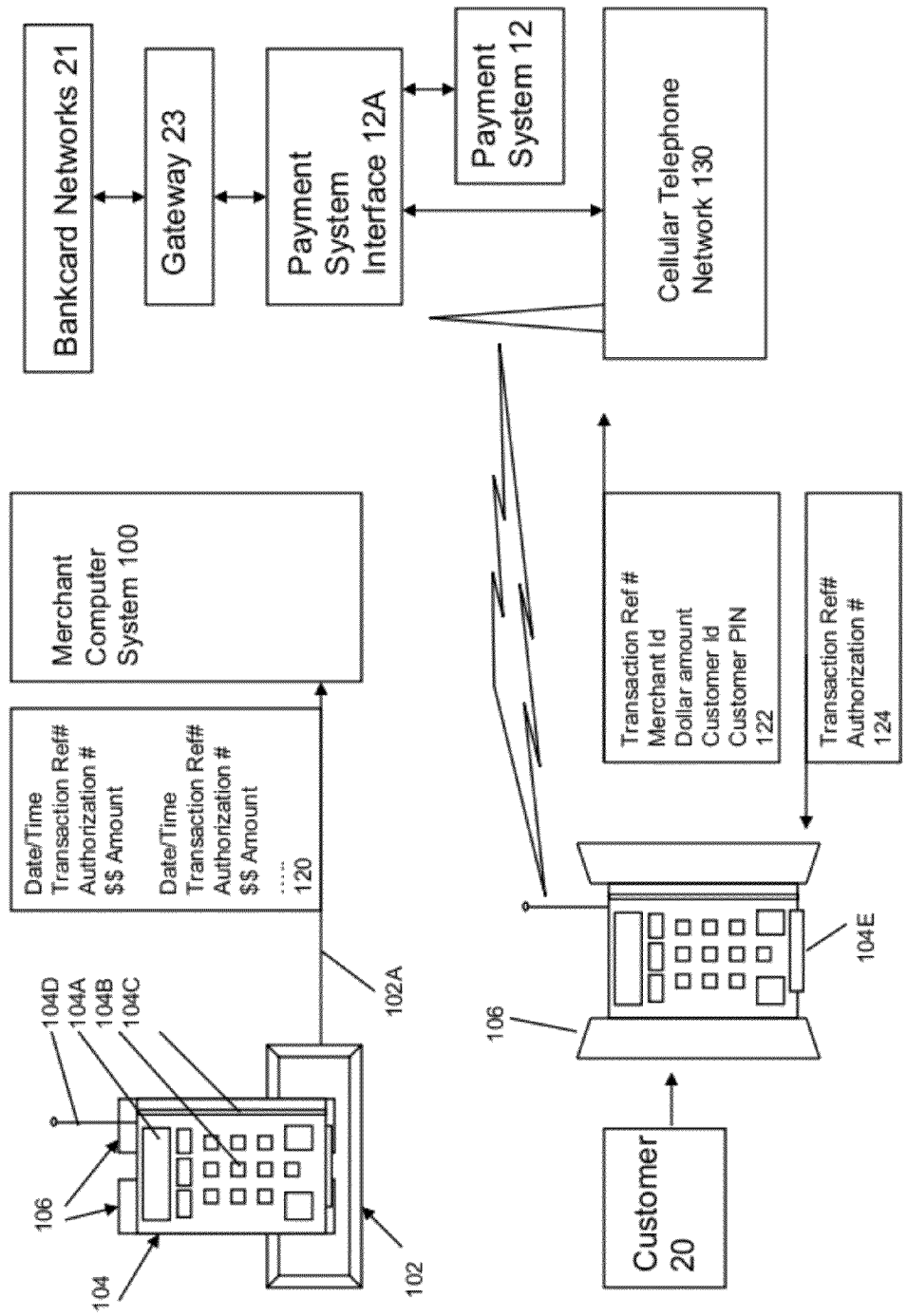

The payment system interface 12A can include an input device (not shown), such as a keyboard, mouse or voice recognition software and a display that allows access to the payment system 12. As illustrated in FIGS. 1A, 1D and 1E, the payment system interface 12A interfaces with a gateway 23, which interfaces with a bank card authorization network 21. The gateway 23 is a computer system that routs the data for payment authorization to the bank card authorization network 21, based on the bank routing number, usually the first 4 digits of the bankcard number. The bankcard authorization network 21 is computer systems that process data from an existing bankcard 31. The bankcard authorization network 21 receives the payment transaction data regarding the bankcard 31 and returns payment authorization data. The gateway 23 and network 21 can be similar to existing prior art devices used to process existing bankcards.

The payment system processor 29 is operative with the payment system program 28 to perform the steps outlined in FIGS. 6A-6C and 7.

A customer network interface 20B allows the customer 20 to communicate with the payment system 12 and/or the merchant 22. Conventional internal or external modems may serve as the customer network interface 20B. In one embodiment, the customer network interface 20B is connected to the merchant interface 22A and the payment system interface 12A on the global network 24. Alternately, the customer network interface 20B can be connected by other electronic, voice and/or traditional communication systems that allow the customer 20 to interact with the merchant interface 22A and the payment system interface 12A.

The customer interface 20A can include an input device, such as a keyboard, mouse or voice recognition software and a display that allows the customer 20 to interact with the customer network interface 20B.

A merchant network interface 22B allows the merchant 22 to communicate with the gateway 23. Conventional internal or external modems may serve as the merchant network interface 22B. The merchant network interface 22B can be connected to the customer interface 20A on the global network 24. Alternately, the merchant network interface 22B can be connected by other electronic, voice and/or traditional communication systems that allow the merchant 22 to interact with the gateway 23.

The merchant system interface 22A can include an input device, such as a keyboard, mouse or voice recognition software and a display that allows access to the gateway 23.

Payment Card 30

With reference to FIG. 1B, the payment card 30 has front side 30A and back side 30B. The front side 30A can include the name of the card 32A, and the customer name 32B. The customer name 32B can be a chosen alias 354B of the customer as described later with reference to FIGS. 3D and 5B. The back side 30B can include a machine readable area 33 such as a magnetic strip. The magnetic strip can include data in an encoded form. The data can include a customer identifier 320. One form of the customer identifier 320 is described later with reference to FIG. 4C.

In some of the embodiments, the information and data contained in the magnetic strip does not contain any of the private data 25 of the customer such as the name, the customer address, the card number(s) of the existing bank cards 31 of the customer 20 and/or the expiration date of the existing bank cards 31 of the customer 20. With this design, if the payment card 30 fell into wrong hands, it does not identify the name of the customer and the existing bank card(s) of the customer 20.

Bank Card 31

FIG. 1C illustrates a bankcard 31 that can be used in conjunction with the present invention. The bankcard 31 can be a debit card, a credit card, a check card, or another type of card already obtained by the customer. The bank card 31 can include private data 25 of the customer 20 including the name, number of the bank card, expiration date of the bank card 31 and signature as illustrated on front and back sides 31A and 31B of the bank card 31.

Payment Card 30 Usage

With reference to FIG. 1D, when the customer 20 is using the payment card 30 at the location of the merchant 22, the payment card 30 can be swiped in a card reader 34 that is at the location of the merchant 22. The card reader 34 is adapted to read the readable area 33 of the payment card 30. The card reader 34 can include a display window 34A, a card slide slot 34B, function buttons 34C that enables the selection of one of the bank cards, a numeric keypad 34D, an enter button 34E and Yes/No button 34F. Subsequently, the customer 20 uses the buttons 34C to select the type of transaction and enters a PIN number using the numeric keypad 34D. The merchant interface 22A generates a merchant identifier and a total payment amount for the transaction. The merchant identifier can be any combination of characters that identifies the merchant 22. The total payment amount for the transaction will vary according to the transaction. The transaction can be for one or more purchased item(s) and/or services from the merchant.

Next, the data from the payment card 30, the merchant identifier and payment amount is then sent to the gateway 23 using the merchant network interface 22B. In this embodiment, the gateway 23 is adapted to recognize and/or identify the payment card 30 relative to other bankcards 31. When the gateway 23 detects that the payment card 30 is being used, the gateway 23 connects to and sends the payment card number and PIN data to the payment system 12 and waits for the payment system 12 to send the customer name, the number of the bank card and the expiration date of the bank card 31 from the payment system 12 to the gateway 23. The adapted gateway 23 then reassembles the payment transaction data of name, the bankcard number, expiration date, merchant identifier and amount and sends that to the bankcard authorization network 21. The bankcard authorization network 21 uses this information to determine if the bankcard is good to cover the transaction. If acceptable the authorization network 21 provides a payment authorization number that is forwarded to the merchant via the gateway 23. Additionally, the bankcard of the customer is charged or debited by the authorization network 21.

Alternately, referring to FIG. 1D, the customer 20 can use the payment card 30 to make a transaction in a location, away from the merchant using the world wide web. In this version, the customer 20, instead of being physically at the location of the merchant 22, is making a payment through a merchant web page 36, that displays the merchant identifier 36A, the payment amount 36B, a space for entry of card number 36C of the payment card 30, the expiration data 36D of the payment card 30, the name 36E of the customer and the e-mail address 36F of the customer. The customer 20 enters the payment card 30 data such as card number, expiration date, name and e-mail. Some of the data to be entered here is illustrated later with reference to FIG. 4B.

Subsequently, the information is transferred to the gateway 23. When the gateway 23 receives the connection and data from the merchant web page 36, the adapted gateway 23 detects the use of the payment card 30 and forwards the data to the payment system 12. The payment system 12, using the data received via the gateway 23, searches the payment system databases 38A-38D (illustrated in FIG. 2), and assembles the pieces of a payment transaction including customer name, the number of the bank card, the expiration date of the bank card, and forwards that to gateway 23, which completes the assembly of payment transaction record along with merchant identifier and amount forwards to the bank card authorization network 21. The bankcard authorization network 21 processes a payment from one of the bankcards 31 of the customer and generates a payment authorization number. For each payment transaction, the gateway 23 or the merchant interface 22A generates a reference number. The reference number is used to reference a particular payment from other payments processed through the gateway 23 and the authorization network 21. On payment approval, the reference number, and a payment authorization number are returned to the merchant interface 22A. The reference number and the payment authorization number is a "privacy payment" that does not identify the customer to the merchant.

The card authorization network 21 cannot distinguish this payment transaction from any other card payment transaction it may receive directly from the gateway 23. The card authorization network 21 processes the transaction and responds with the payment authorization and reference number for the transaction. On receiving the payment authorization number, the gateway 23 forwards the information to the merchant 22. Additionally, the bankcard of the customer is charged or debited by the authorization network 21.

FIG. 1E illustrates an alternative way to conduct a transaction using the payment card 30. In this alternative embodiment, the payment transaction data is directly received by the payment system 12 with the help of a wireless network without it first going to the gateway 23. The payment system 12, with this payment data, is able to assemble the complete payment data of the customer including the customer name, bank card number, expiration date, amount and merchant identifier and forward that to the gateway 23, which in turn forwards it to the authorization network 21. In this embodiment, the gateway 23 need not be adapted to recognize a payment card.

Further, in this embodiment, a merchant computer system 100, a wireless data input device 104 and a docking station 102, can be utilized. The docking station 102 is used to charge the device 104 and to transfer data 102A between the input device 104 and the merchant computer system 100. The input device 104 can include privacy shields 106 that are hinged to the left and/or right sides of the device 104. The shields 106 may be folded when the device 104 is put in the docking station 102. The shields 106 may be unfolded when used by the customer 20.

The device 104 can include a display screen 104A, a keypad 104B, a card reader mechanism 104C and antenna 104D. The device 104 can include memory for storing details of multiple transactions (not shown). The device 104 may also have a printing mechanism (not shown).

The merchant 22 can pre-program the device 104 with the merchant identifier 51 that enables the payment system 12 to identify the merchant. The merchant, at the time of a payment transaction with the customer, may remove the device 104 from the docking station 102, enter the dollar amount of the transaction using keypad 104B and display screen 104A, and then transfer the device 104 to the customer 20.

The device 104 enables the customer 20, to review the dollar amount of the transaction and to swipe the payment card 30 and then enter a personal identification number in the device 104. The device 104 forwards the customer data and merchant data as a data block 122 to the payment system 12 using a wireless cellular network 130.

The payment system 12, using the customer data and merchant data, as described elsewhere in this application, runs a credit card transaction using the gateway 23 and the payment network 21 and returns the reference number and the payment authorization number for this transaction 124 to the device 104. The customer reviews the authorization. The device 104 can include a printer (not shown) for printing a confirmation slip that lists the date, the merchant, the dollar amount and/or the reference number. The customer subsequently transfers the device 104 to the merchant. The merchant may return the device 104 back to the docking station 102 or use the device 104 for another transaction with another customer. The docking station 102 reads the payment data of each transaction from the device 104 by the transaction's date/time, reference numbers and authorization numbers, dollar amount 120 and transfers the data to the merchant computer system 100.

System Program 28

The payment system program 28 is operative with the payment system processor 29 to provide the functions of (i) interfacing with the customer 20 to receive and save customer private data 25 in databases 38A-38D via web pages 500A-500B, (ii) interface with the gateway 23 to receive payment transaction data from the merchant 22, (iii) process payment transaction data by searching databases 38A-38D to assemble an existing card payment transaction data, and (iv) to interface with the card networks 21 to send the transaction data and receive payment authorization number and a reference number. Further, the system program 28 is operated with the payment system processor 29 to perform the tasks of the payment system 12 provided herein.

Customer Database 38

With reference to FIG. 2, the customer database 38 within the payment system 12 contains private data 25 specifically related to the customer 20 that is transferred to the privacy system 12 from the customer. The private data 25 related to the customer 20 can be separated and stored in at least four separate sub-databases, namely, (i) an identifier sub-database 38A, (ii) identifying data sub-database 38B, (iii) existing bank card data sub-database 38C, and (iv) payment card PIN data sub-database 38D of each customer 20. The sub-databases are explained below.

Identifier Database 38A

Referring to FIGS. 2 and 3A, the payment system 12 can store a customer identifier 320 for each of the customers 20 in the identifier database 38A. As provided herein, the customer identifier 320 can be used to anonymously identify and verify the customer 20 for gaining access to and interacting with the payment system 12. The customer identifier 320 enables the customer 20 to interact with and use the payment system 12 without revealing private data of the customer. Stated another way, the customer identifier 320 enables the customer 20 to be anonymously identified to the payment system 12.

The customer identifier 320 can be any number of characters that can be used to identify and verify the customer 20 for gaining access to and interacting with the payment system 12. The customer identifier 320 can be self-created by the customer 20. More specifically, the customer 20 can create the exact characters that make up the customer identifier 320 without the aid or authority of any business, the payment system 12 or government entity. However, as provided herein, the payment system 12 can provide a guideline for the format of the customer identifier 320. The details of the customer identifier 320 are explained in more detail below.

The payment system 12 can also assign and associate a unique sequence number 330 for each customer identifier 320. The sequence number 330 can include any number of characters. The sequence number 330 is subsequently used as a reference to save and retrieve the private data 25 of the customer 20 in the identifying database 38B, existing bankcard data database 38C and payment card data database 38D. The sequence number 330 can also be stored with the customer identifier 320 in the identifier database 38A.

The customer 20 can access the payment system 12 using the customer network interface 20B. Upon the entry of the customer identifier 320 by the customer 20 via the customer interface 20A, the payment system program 28 operates with the payment system processor 29 to review the identifier database 38A to check for the existence of the customer identifier 320. Upon the location of an existing customer identifier 320, the payment system 12 allows the customer 20 to have access to the private data 25 that is tied to the customer identifier 320. The identifier database 38A is also used to store the new customer identifier 320 for each new customer 20 that creates a new customer identifier 320.

Identifying Database 38B

Figure 3B:
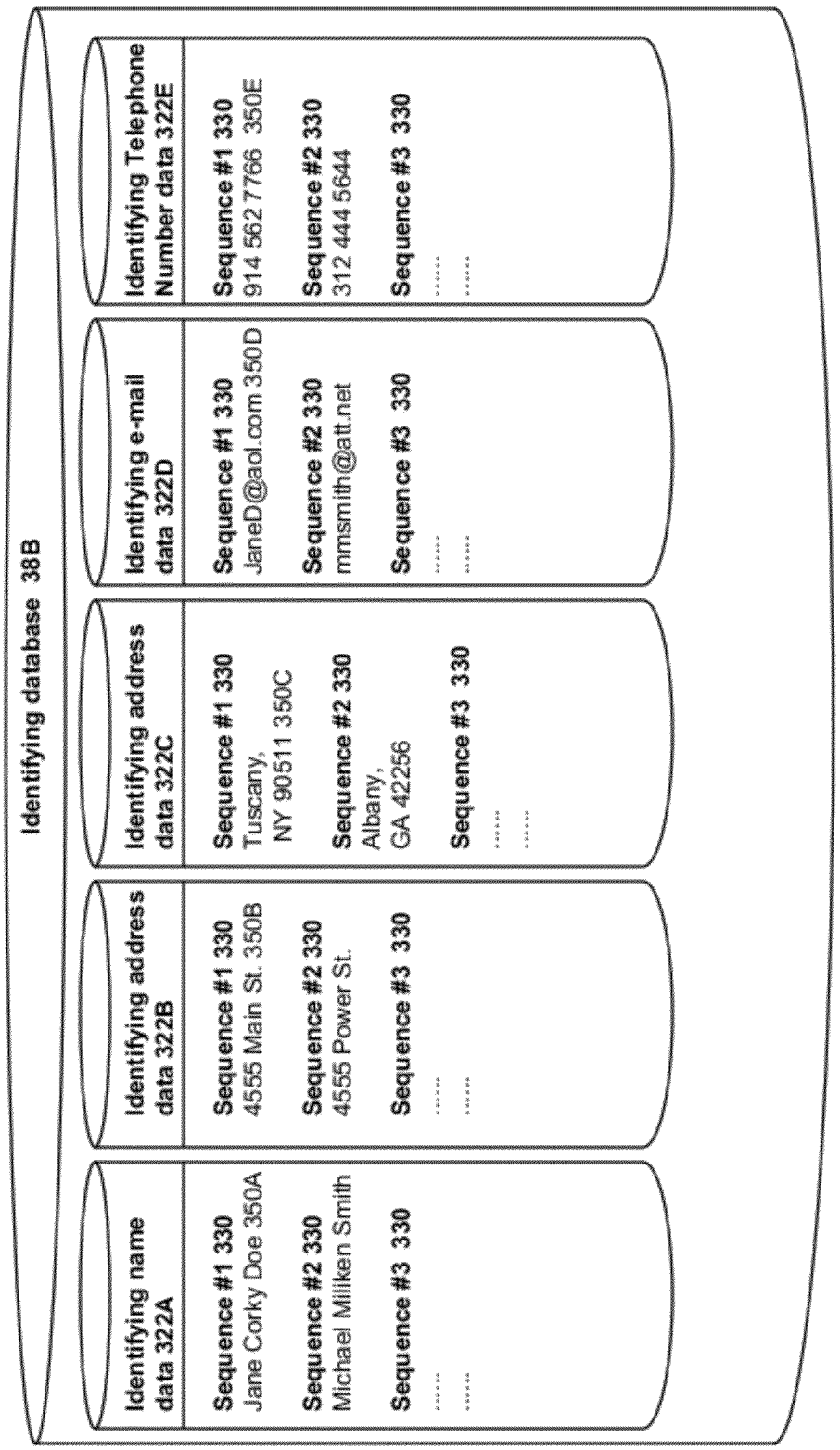

Referring to FIG. 3B, the payment system 12 can store any identifying data 322 of the customer 20 in the identifying database 38B of the storage device 26. Identifying data 322, as used herein, shall mean any information or data of the customer 20 that if used independently is sufficient to positively identify the customer 20 to a third party. Examples of identifying data 322 can include, a name, an address, a telephone number, a facsimile number, an e-mail address, a social security number, credit card number, and/or a driver license number of the customer 20.

The identifying data 322 can be kept in the identifying database 38B of the payment system 12 in a manner that safeguards the privacy of the identifying data 322 in the storage device. Many approaches may be used to safeguard the privacy of identifying data 322. For example, access to the identifying database 38B can be controlled by a password (not shown).

The present invention also discloses a method that may be used in conjunction with and/or separately from any other methods to make the identifying data 322 stored in the identifying database 38B more secure. This method uses separate databases for each piece of the data. As a simplified illustration, referring to FIG. 3B, the name 350A, street address 350B, city/state/zip address 350C, e-mail address 350D, and telephone number 350E of the customer may be kept in physically separate databases 322A to 322E respectively. The data pieces within the separate sub-databases are referenced to the customer by the sequence number 330 and are accessible by using the sequence number 330. In this method, the identifying data of the customer is fragmented over many databases and storage devices, such that one database only stores partial information of the customer.

Existing Bank Card Data Database 38C

With reference to FIG. 3C, the information and data relating to the existing bankcards 31 of the customer 20 can be stored as multiple partial card data in multiple databases of the payment system. As a simplified illustration, for each bankcard 31, the customer name is stored as data 322A in database 38B (illustrated in FIG. 3B) and the card number and card expiration as data 324A and 324B in database 38C. The database 324A may store card numbers 352A. The data relating to the multiple bankcards of the customer can be stored and anchored by sequence number 330. Database 324B can store for each of the bank cards, its corresponding expiration date 352B and for those bank cards for which a PIN is used, the PIN of the bank card 352C.

Existing Card Data Security Methods

To provide yet another level of security, for each bankcard 31, the card number and the expiration date may be partitioned, as partial data elements into separate databases. There are many methods of creating partial data elements, some of them are described herein. The details of breaking the data into partial data elements and then reconstructing the original data from the partial data elements are exclusively embedded in the logic of the payment system program which stores and retrieves the data and is not part of the data itself. This provides a level of security to the data of the bankcard that is stored in the payment system. Some examples of logic that may be used in creating partial data elements are described as follows:

Method 1: partial data elements are 16 digits of the card number and expiration date of the bankcards.

Method 2: partial data elements are the first 4 digits of the 16 digits of the card number and remainder 12 digits added to the 4 digits of the expiration date.

Method 3: partial data elements are the first 8 digits of the 16 digits of the card number and the remainder 8 digits added to the 4 digits of the expiration date.

Method 4: partial data elements are five sequences of four 4-digits of the 16 digits of the card number and 4 digits of the expiration date.

Method 5: partial data elements are five sequences of four 4-digits of the 16 digits of the card number and 4-digits of the expiration date. Wherein the five sequences are stored in a random order, the order of randomness being part of data storage and data retrieval logic.

Method 6: partial data elements are five sequences of four 4-digits of the 16 digits of the card number and 4-digits of the expiration date. Wherein any one 4-digit number, selected in a random order is offset by an offset number, the random order and offset number being part of data storage and data retrieval logic.

Method 7: Any permutation or combination of the methods 1 to 6 discussed above.

Figure 3E:
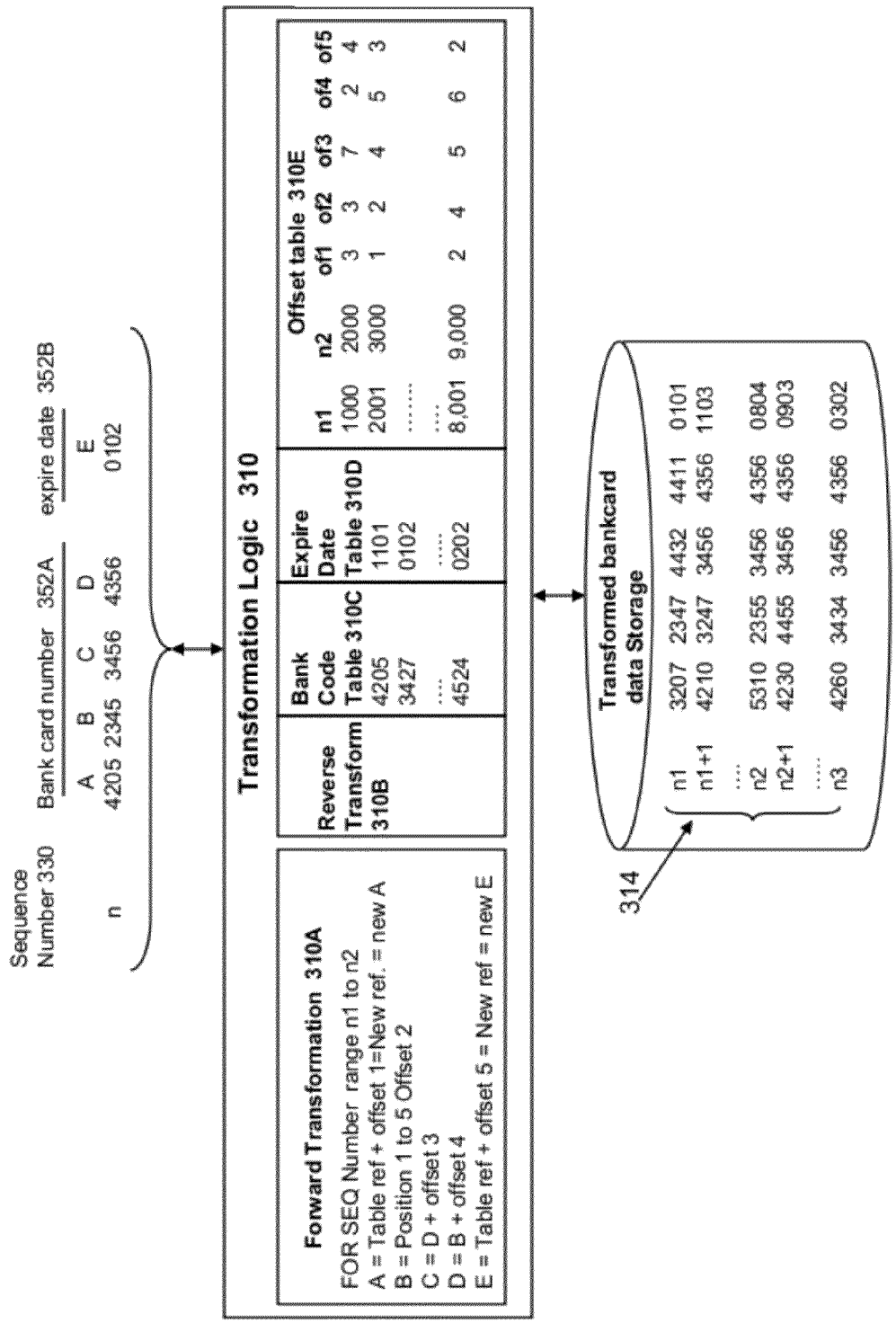

One of the data security methods described above is illustrated with a simplified illustration in FIG. 3E. The number 352A of the bankcard is referenced by the sequence number 330. As detailed below, the original information is transferred into equivalent information that is indistinguishable in format to the original information. To be indistinguishable, for example, (i) numbers in the original information are replaced with alternate numbers in the equivalent information, and (ii) letters in the original information are replaced with alternate letters in the equivalent information. The bankcard number 352A is broken into four original elements A, B, C and D. The element A is a bank code that identifies the bank that issued the bankcard. The expiration date 352B is called original element E.

A transformation logic 310 within the system program 28 is used to transform the bankcard data 352A and 352B into equivalent data elements 314 for storage. The transformation logic 310 takes the original bankcard data elements and transforms the data into an equivalent bankcard data elements that is indistinguishable from the original bankcard data in format. Subsequently, the equivalent data elements are stored in the payment system.

This method of data storage obviates the need and expense for extra-ordinary measures to secure and safeguard the databases. The transformation logic 310 is the only knowledge that needs to be protected. The transformation logic 310 is only known to the creators of the logic design and is further stored in the computer system as complied code, and thus not accessible for theft directly from the computer system.

The transformation logic 310 has a forward transform logic 310A, a reverse transform logic 310B, a bank code table 310C listing all the possible bank codes, an expiration date table 310D, listing all the possible expiration dates and an offset table 310E, listing the offsets that are applied to the elements A, B, C, D, and E for a range of sequence numbers.

For a bankcard data that is input to the logic 310, the forward transform logic 310A, determines the range of the sequence number. Then using this range it reads the offsets for that range from table 310E. Offset 1 is applied to original element A to get equivalent element A, offset 2 is applied to original element B to get equivalent element B, offset 3 is applied to original element C to get equivalent element C, offset 4 is applied to original element D to get equivalent element D and offset 5 is applied to original element E to get equivalent element E.

These offsets can be of many types. For example, the offsets for element A and E enable an equivalent bank code and expiration date from the tables 310C and 310D. Offsets for element B, C and D provide a means for new equivalent elements B, C and D.

The reverse transform logic 310B, using the sequence number 330 as an input parameter, enables the equivalent bank card data 314 to be converted back to the original bank card data of 352A and 352B.

It is believed, using this type of transformation logic, there is no correlation between the equivalent bankcard data and the original bankcard data, such that a thief or hacker cannot determine the original bankcard data. It obviates the need for extra-ordinary measures to safeguard the bankcard databases.

Payment Card Data Database 38D

With reference to FIG. 3D, the data of the payment card 30 of the customers 20 can be stored within two databases 326A and 326B. The database 326A may store PIN numbers 354A for each bank card 31 in database 324A, that have been self-selected by the customer 20. The sequence number 330 anchors the PIN data of each customer. Database 326B may store for each customer the self-selected alias name 354B of the customer. The sequence number 330 also anchors the alias name data 326B of the customer.

Customer Identifier

Figure 4A:
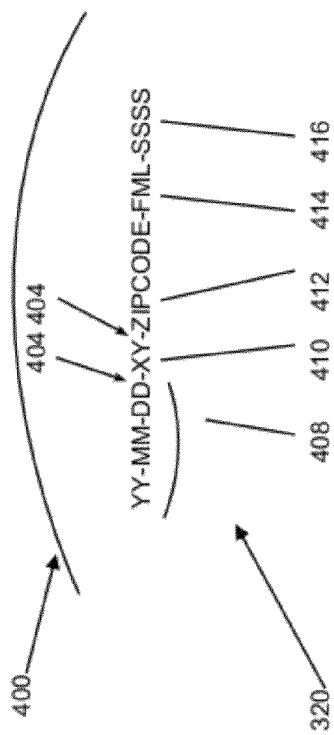
FIG. 4A-4C illustrates a customer identifier having features of the present invention.

FIG. 4A illustrates one embodiment of a customer identifier 320. The customer identifier 320 illustrated in FIG. 4 utilizes a single data string 400 that can be used to anonymously verify the customer 20 to the payment system 12. Because there is no public identification step, the identity of the customer 20 can be maintained within the payment system 12 without formally and publicly identifying the customer 20 to the payment system 12. Further, the customers 20 can access the payment system 12 without personally identifying themselves to the payment system 12.

The anonymous identifier 320 can include one or more elements 408, 410, 412, 414, 416 that are separated by a delimiter 404. The elements 408-416 make it easy for the customer 20 to create, use and remember the anonymous identifier 320. Each of the elements 408-416, for example, can include one or more easy to remember characters.

As provided herein, a first element 408 can include the sub-elements of a calendar date. A second element 410 may be a class code of the customer 20. A third element 412 may be in the form of a location code of the customer 20. A fourth element 414 may be a name abbreviation of the customer 20. A fifth element 416 can be a sequence code.

Any combination and/or organization of one or more of the elements 408-416 as described above may be used as the customer identifier 320. The customer identifier 320 can be self-created by the customer 20 the first time the customer 20 interacts with the payment system 12. After the customer identifier 320 is created, it can be stored in the identifier database 38A by the payment system 12. Subsequently, the customer identifier 320 is used to verify the customer 20 to the payment system 12 so that the customer has access to the private data 25 of the customer in the payment system 12.

Figure 4B:
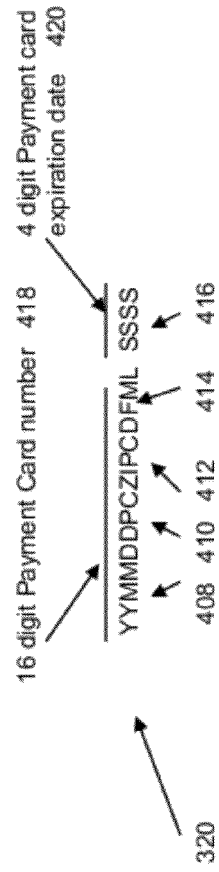

FIG. 4B illustrates a form of the customer identifier 320 that may be used for a web based payment transaction, where the card number, expiration date, and name need to be provided. It may also be used where the customer 20 has established a voice communication with an employee of the merchant to process the payment transaction. A sixteen digit payment card number 418 is provided. This card number has the customer identifier 320 that includes elements of date 408, personal code 410, zip code 412, and name initials 414 as one continuous string. A card expiration date string 420 of 4 digits may be provided. This string 420 may be the payment card PIN 354A that identifies the particular existing bankcard the customer may choose for this transaction. For the name, the customer may provide an alias name 354B. The payment card PIN 354A and alias name 354B are illustrated in FIGS. 3D and 5B.

Figure 4C:

FIG. 4C illustrates a form of customer identifier 320 that may be stored in the readable area 33 of the payment card 30. The customer identifier is encoded 422 and the code number 424 used for encoding is embedded by appending it as part of the encoded customer identifier.

Referring to FIG. 3D, the payment card database 38D maintains the encoding data 326C as data items code number 354C and the code algorithm 354D. When a transaction using the card 30 is received at the payment system 12 via the gateway 23, the corresponding algorithm is retrieved from database 326C to decode the customer identifier. This can provide a level of security to the customer, if the card 30 falls in the possession of a dishonest person.

Merchant Database 40

The merchant database 40 maintains data on all of the merchants 22 that interact with the payment system 12. The merchant database 40 can store (i) a merchant identifier 51 and (ii) the merchant date 40A, e.g. the name, address, phone, facsimile, web page, and/or electronic mail address of the merchant together in one sub-database. A merchant 22 may connect to payment system 12 and enter/update merchant data. In one of the embodiments, the merchant database 40 may be used to verify that the merchant identifier 51 is correct when the payment system 12 receives the payment transaction data from the merchant 22. It may also be used for billing purposes if a merchant is charged fees for interfacing with the payment system 12. Additionally, the merchant database 40 may be used to keep payment transaction data such as merchant identifier, reference number, authorization number, date, time, and amount for archival enabling later retrieval and or reference by the merchant.

Payment System Web Pages 500

In an optional version of the present invention, the payment system program 28 is operative with the payment system processor 29 to generate one or more web pages 500A on the world wide web. The web pages 500A allow each customer 20 to provide information through the customer interface 20A to the payment system 12. Alternately, for example, instead of the world wide web, the customer 20 can provide some or all of the information to the payment system 12 via voice mail, facsimile, or postal mail transmissions.

FIG. 5A illustrates an example of an initial payment system web page 500A. The initial system web page 500A can be displayed on the customer interface 20A when the customer 20 first registers with the payment system.

The initial payment system web page 500A illustrated in FIG. 5A includes (i) an area for entry of the customer identifier 320, including areas for entering the data element 408, the personal element 410, the location element 412, the name element 414 and the number element 416 of the customer identifier 320 of the customer 20 and (ii) a SEND icon 514.

After the customer 20 enters the required information and clicks the SEND icon 514, the payment system 12 receives and validates the customer identifier 320. Subsequently, the payment system 12 generates a data type page 536 that allows the customer 20 to select data type to enter/retrieve 522 from (i) identifying data 322, (ii) existing bank card data 324 and payment card data 326. After selection of a data type and clicking SEND icon 534, a data web page 500B with the corresponding data type forms 524A, 524B and 524C, are displayed. FIG. 5B illustrates a data web page 500B for entering customer private data 25. Form 524A on the web page allows entry of identifying data 322A-E such as name 350A, address 350B, city/state/zip 350C, telephone 350D and e-mail address 350E. Form 524B on the web page allows entry of existing bank card data 324A-C such as card number 352A, card expiration date 352B and a bank PIN 352C, if required for the specific bank card. Form 524C allows entry of payment card PIN 354A and alias name 354B. The payment card PIN 354A is created and entered for each of the existing card numbers 352A of the customer and enables the customer to select any one of the existing cards when conducting a payment transaction using the payment card.

Operation

Figure 6A:
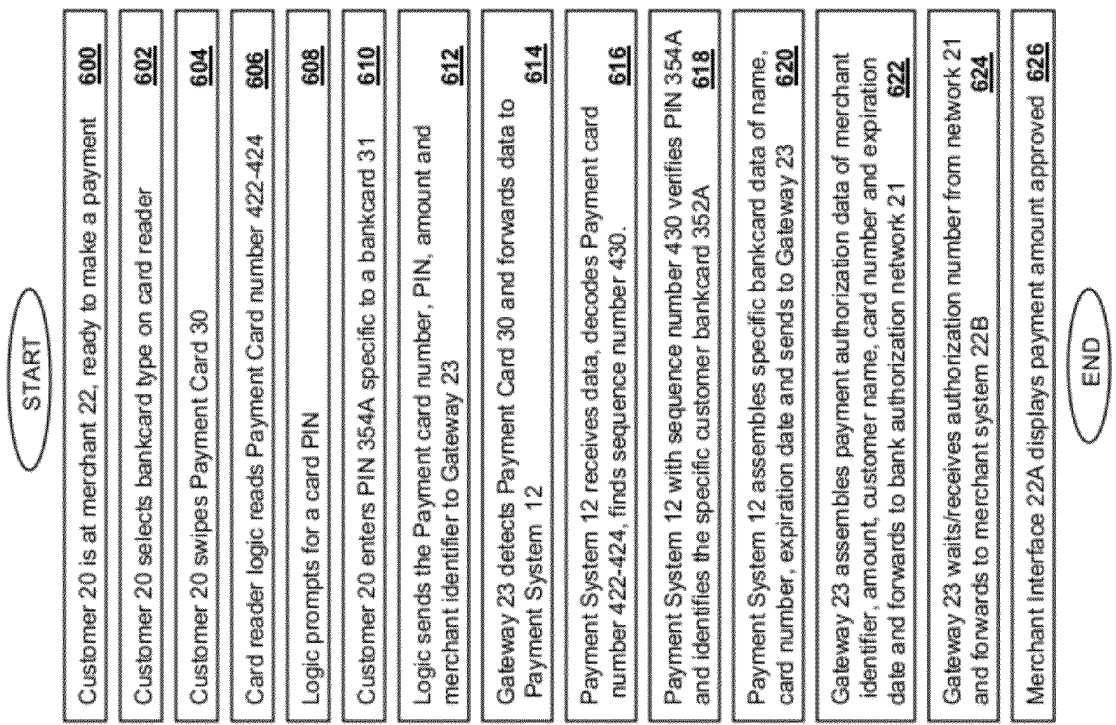
FIGS. 6A-6C and 7 are block diagrams that outline the operation of a method and apparatus having features of the present invention.
Figure 6B:
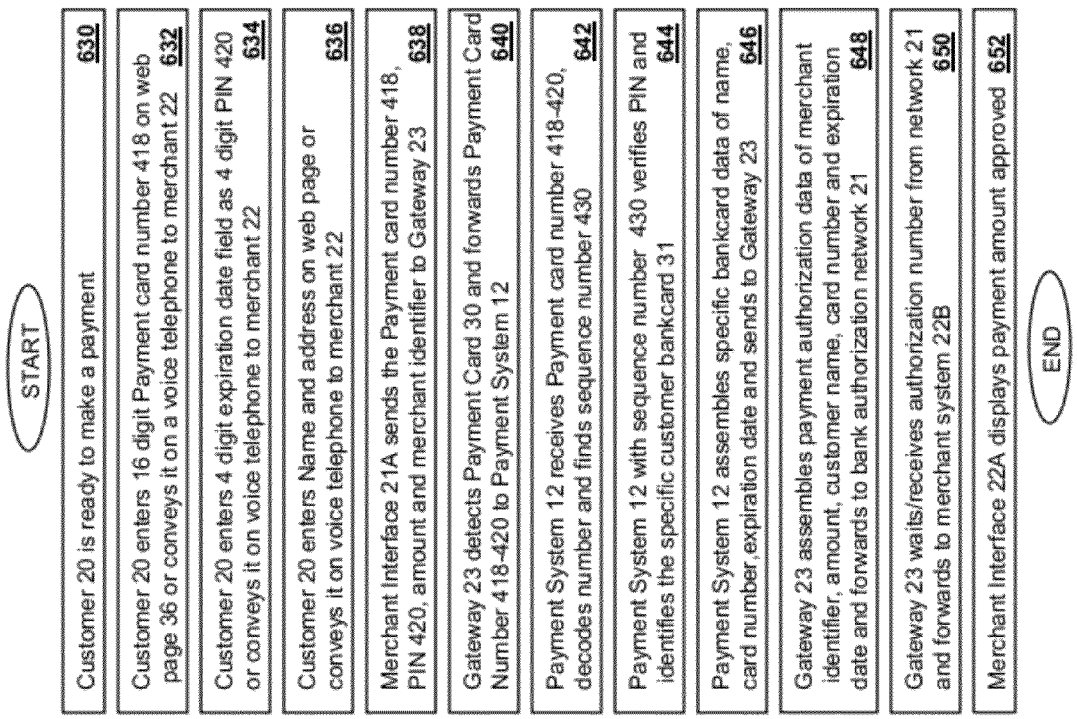
Figure 6C:
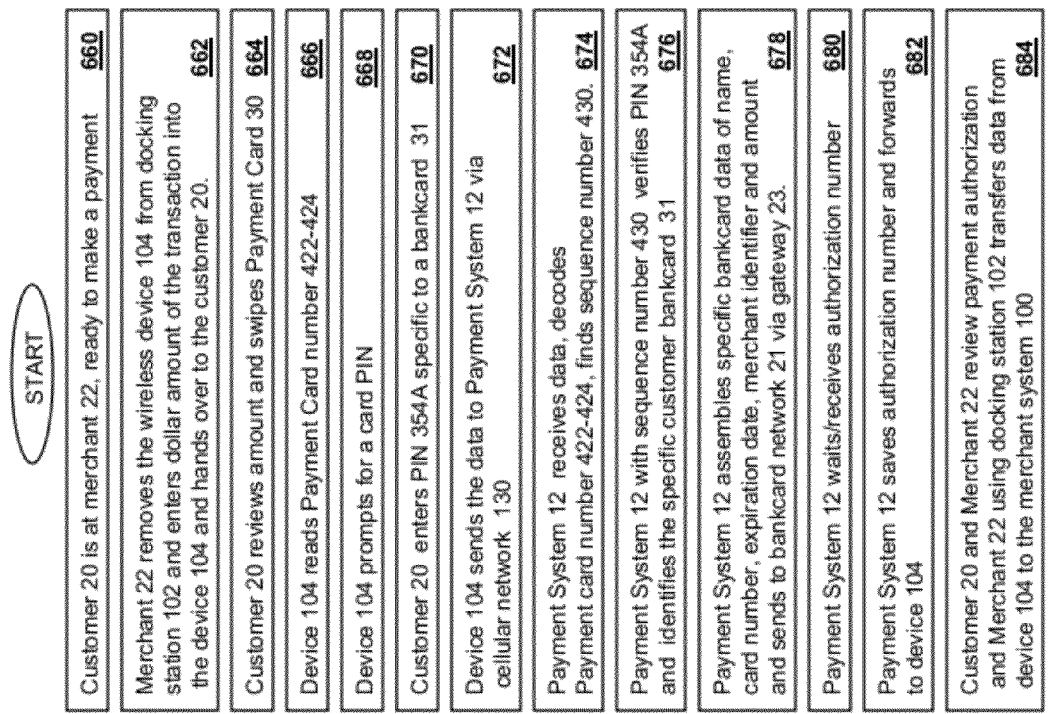
Figure 7:
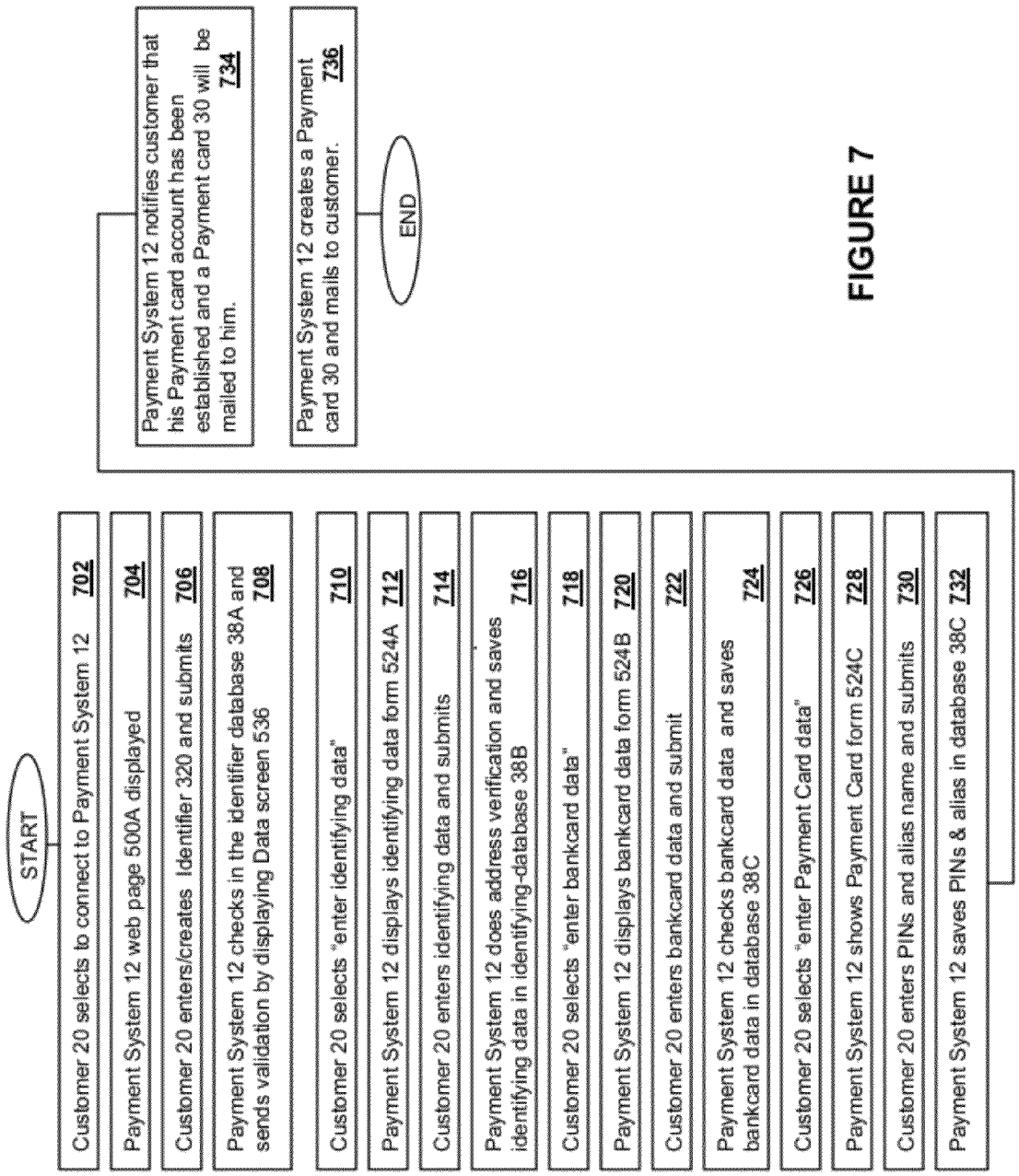

The operation of the apparatus 10 and payment system 12 for a payment transaction can be further understood with reference to the flow charts illustrated in FIGS. 6A-7. The operation of the payment card in processing a payment transaction can be better understood with reference to FIGS. 6A, 6B and 6C. The method for the customer 20 to establish an account with the payment system 12 is illustrated in FIG. 7. Importantly, the order of some or all of the steps can be varied. Further, not all of the steps outlined below are necessary to perform a transaction pursuant to the present invention.

More specifically, FIG. 6A outlines the steps for using the payment system 12 when the customer is at the location of the merchant. Referring initially to FIG. 6A, at step 600, the customer 20 is at the site of the merchant 22, ready to make a payment. At step 602, the customer selects the type of bankcard using the reader as a debit card because a debit card requires entry of PIN to complete the transaction. At step 604 the customer swipes the payment card through the reader. At step 606, the card reader logic reads the payment card number. At step 608, the logic prompts the customer for a PIN number. At step 610, the customer enters the PIN specific to one of the bankcards that the customer wishes to use for this particular payment. At step 612, the logic sends the payment card number, PIN, dollar amount that has been entered by the merchant, and the merchant identifier to the adapted gateway 23. At step 614, the adapted gateway detects the use of a payment card and forwards data to the payment system 12. At step 616, the payment system 12 receives this data, decodes the card number, finds the sequence number. At step 618, the payment system uses the sequence number to get and verify the PIN.

At step 620, the payment system assembles the specific card data for one of the bankcards of the customer 20, as identified by the PIN and sends that data to the adapted gateway 23. The card data can include the name, card number, expiration date. The adapted gateway using that data and merchant identifier and the amount, forwards the information to the card network 21. At step 622, the card network 21 processes the transaction and returns an authorization number to the gateway 23. At step 624, the gateway 23 forwards the authorization number to the merchant system. At step 626, the card reader displays that the transaction is approved.

FIG. 6B outlines the steps for using the payment system when the customer is at a location away from that of the merchant. With reference to FIG. 6B, at step 630, the customer is ready to make a payment. At step 632, the customer has shopped at the web page of the merchant and/or viewed a catalog of the merchant and enters the 16-digit card number of the payment card on the merchant web page or conveys it on a voice telephone to the merchant. At step 634, the customer enters 4-digit expiration date field as 4 digit PIN or conveys it on voice telephone to the employee of the merchant. At step 636, the customer 20 enters the name and e-mail address on web page or conveys it on voice telephone to the employee of the merchant. At step 638, the Merchant or web logic sends the payment card number, pin, amount and merchant identifier to the gateway. At step 640, the adapted gateway 23 detects the use of a payment card 30 and forwards data to the payment system 12. At step 642, the payment system receives the data, the payment card number, and finds the sequence number. At step 644, the payment system uses the sequence number to get and verify the PIN number. At step 646, the payment system 12 assembles specific card data of name, card number, expiration date, and sends the information to the adapted gateway 23, which assembles the complete payment transaction data including merchant identifier and payment amount and forwards the information to bankcard authorization network 21. At step 648, the adapted gateway 23 waits and receives the authorization number and at step 650, forwards the authorization number to the merchant system 22A. At step 652, the web logic displays card approved.

FIG. 6C outlines alternate steps for using the payment system 12 when the customer is at the location of the merchant. In this embodiment, by using a wireless network the merchant interfaces directly with the payment system 12 and bypassing the gateway 23. Hence, the gateway 23 need not be adapted to recognize a payment card number in this embodiment. Here, the payment system assembles a complete payment transaction data and forwards the information to the gateway 23 to be forwarded to network 21. Alternatively the payment system may directly connect to the network 21, bypassing the prior art gateway 23 entirely.

Referring to FIG. 6C, at step 660, the customer is at the site of the merchant 22 and ready to conduct a transaction. At step 662, the Merchant removes the wireless device 104 from the docking station 102 and enters the dollar amount of the transaction into the device 104 and hands the device 104 to the customer 20. At step 664, the customer reviews the dollar amount and swipes the payment card. At step 666, the device 104 logic reads the card number. At step 668, the logic prompts for a card PIN. At step 670 the customer enters a PIN specific to a bankcard. At step 672 the logic sends the payment card number, PIN, amount and merchant identifier to the payment system 12 via the cellular network. At step 674, the payment system 12 receives the data, decodes the payment card number, and finds the sequence number. At step 676, the payment system, with the sequence number, verifies the PIN and identifies the specific bankcard. At step 678, the payment system assembles the specific card data of name, card number, expiration date, merchant identifier and amount and sends the data to payment network 21. At step 680, the payment system waits/receives the authorization number. At step 682 the payment system saves the authorization number and forwards the data to the device 104. At step 684, the customer 20 and the merchant 22 review payment authorization and merchant 22 using the docking station 102, transfers data from the device 104 to the merchant system 100.

One method used by the customer 20 to establish an account with the payment system 12 is illustrated in FIG. 7. At step 702, the customer selects to connect to the payment system 12. At step 704, the payment system web page 500A is displayed. At step 706, the customer enters/creates the customer identifier and submits the customer identifier. At step 708, the payment system checks for the existence of the customer identifier in the identifier database 38A and sends validation by displaying data screen 536. At step 710, the customer selects "enter identifying data". At step 712, the payment system displays identifying data form 524A. At step 714, the customer enters identifying data and selects SEND. At step 716, the payment system does optional address verification from the United States Postal Service database and then saves the identifying data in the identifying-database 38B. At step 718, the customer selects "enter existing card data". At step 720, the payment system displays existing card data form 524B. At step 722, the customer enters existing card data and selects SEND. At step 724, the payment system checks existing bankcard data and saves the existing bankcard data in database 38C. The checking of existing bankcard data may include checking for correct format and optionally may also include checking for stolen and duplicate data by connecting to the bankcard authorization network 21. At step 726, the customer selects "enter payment card data". At step 728, the payment system displays payment card data form 524C. At step 730, the customer enters payment card PIN data 554A for each of the existing cards and alias name 354B and selects SEND. At step 732, the payment system saves PIN data and alias name in database 38D. At step 734, the payment system notifies the customer that the card account has been established and a payment card will be mailed to the customer. This notification can be by e-mail, U.S. mail or a sign off message on the web page 500A. At step 736, the payment system creates a payment card 30 and mails it to the customer 20.

In summary, the payment system 12 allows the customer 20 to maintain one payment card 30 that can be used to facilitate the anonymous use of the other existing bankcards 31 of the customer. The payment system can store the private data 25 of the customer anonymously by separating the data elements in separate databases. The customer can conduct a transaction and receive a service or product from the merchant 22 without disclosing the name, address, private data and credit card information of the customer 20 to the merchant 22. The payment system 12 minimizes the number of people, businesses and institutions that have access to the private information of the customer 20. This minimizes the opportunity for the private information of the customer 20 to be improperly disseminated.

While the particular apparatus 10 and method as illustrated herein and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

The invention claimed is:

1. A financial transaction terminal for inputting personal information of a customer for use with a bankcard transaction, the transaction terminal, comprising:
   a. an input device with opposing sides and a face that includes a keypad, for selectively inputting the personal identification information incident to use of the bankcard by the customer;
   b. the input device is portable and movable to be positioned in a location that is easily accessible to the customer;
   c. a privacy shield that is positioned adjacent to and near the keypad on the input device itself, the privacy shield allows for an unobstructed view of top of the keypad to the customer, without an intervening surface between the customer and the keypad, while inhibiting others from viewing personal information as it is being entered into the keypad by the customer;
   d. the shield has at least two generally vertical members that only extend away from the face of the input device, the vertical members shield view of the keypad from the sides of the input device.

2. The claim as in 1, comprising:
   the privacy shield is part of the keypad that is used in the financial transaction terminal where entry of personal information is required of the customer.

3. A security device for use by a customer in a sales terminal, comprising:
   an input device with opposing sides and a face that has positioned on it a keypad;
   the input device is portable and movable to be positioned in a location that is easily accessible to the customer;
   a privacy shield positioned around the sides of the keypad, on the input device itself, the shield allows for an unobstructed view of top of the keypad to the customer, without an intervening surface between the customer and the keypad, as the security device provides privacy to the customer when entering a PIN in the keypad incident to use of a bankcard in a sales transaction;

the shield has at least two generally vertical members that only extend away from the face of the input device, where the vertical members shield view of the keypad from sides of the input device.

4. The security device as in claim 3, comprising:
the privacy shield is affixed to the sales terminal.

5. A merchant point of sale terminal with an input device for inputting and receiving bankcard data for processing a payment transaction from a customer to a merchant, comprising:
- a. the input device has opposing sides and a face and has a key pad on the face for entering a personal information (PI) by the customer incident to use of the bankcard for the payment transaction;
- b. the input device has a privacy shield, that is positioned adjacent to and near the keypad on the input device itself, the shield allows for an unobstructed view of top of the keypad to the customer, without an intervening surface between the customer and the keypad, and provides privacy to the customer when entering the PI in the keypad;
- c. the shield has at least two generally vertical members that only extend away from the face of the input device, where the vertical members shield view of the keypad from sides of the device.

6. The claim as in 5, further comprising:
the privacy shield is affixed to the device.

7. The claim as in 5, further comprising:
the privacy shield is foldable when not in use.

8. The claim as in 5, further comprising:
- a. the input device has a card reader mechanism and a display screen;
- b. the input device has an interface for communicating with a payment transaction authorization network.

9. A merchant sales terminal, comprising:
- a. the merchant sales terminal positioned in a merchant premises for processing bankcard payments from customers of the merchant at the merchant premises has an input device;
- b. the input device has a face, opposing sides, a bankcard receiving slot, an input interface in the form of a keypad, a display screen and an interface;
- c. the input device has a privacy shield positioned around the keypad on the top of the input device itself to shield view of the keypad incident to the input of a personal identification number in processing of a bankcard transaction requiring entry of the personal identification number;
- d. the privacy shield allows for an unobstructed view of top of the keypad to the customer, without an intervening surface between the customer and the keypad, and has at least two generally vertical members that only extend away from the face of the input device, where the vertical members shield view of the keypad from sides of the input device.

10. The sales terminal as in claim 9, further comprising:
the shield is affixed to the input device.

* * * * *